(12) United States Patent
Gilling

(10) Patent No.: US 11,939,957 B2
(45) Date of Patent: Mar. 26, 2024

(54) MONITORING SYSTEM AND METHOD FOR MONITORING A TIME PERIOD OF A LOCKING STATE OF A ROTOR OF A WIND TURBINE AND WIND TURBINE

(71) Applicant: Siemens Gamesa Renewable Energy A/S, Brande (DK)

(72) Inventor: Lasse Gilling, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/026,968

(22) PCT Filed: Sep. 1, 2021

(86) PCT No.: PCT/EP2021/074086
§ 371 (c)(1),
(2) Date: Mar. 17, 2023

(87) PCT Pub. No.: WO2022/063534
PCT Pub. Date: Mar. 31, 2022

(65) Prior Publication Data
US 2023/0340944 A1      Oct. 26, 2023

(30) Foreign Application Priority Data
Sep. 25, 2020   (EP) ..................................... 20198406

(51) Int. Cl.
*F03D 17/00*      (2016.01)
(52) U.S. Cl.
CPC .......... *F03D 17/00* (2016.05); *F05B 2260/31* (2020.08); *F05B 2270/1095* (2013.01); *F05B 2270/504* (2013.01); *F05B 2270/807* (2013.01)

(58) Field of Classification Search
CPC .................. F03D 17/00; F05B 2260/31; F05B 2270/1095; F05B 2270/504; F05B 2270/807
See application file for complete search history.

(56) References Cited

U.S. PATENT DOCUMENTS 8,028,604 B2 * 10/2011 Moore .................. F03D 7/0248
74/665 F
8,334,608 B2 * 12/2012 Pechlivanoglou .... F03D 7/0248
290/55

(Continued)

FOREIGN PATENT DOCUMENTS

EP         3073109 A1     9/2016

OTHER PUBLICATIONS

PCT Notification of Transmittal of the International Preliminary Report on Patentability dated Jan. 3, 2023 corresponding to PCT International Application No. PCT/EP2021/074086 filed Sep. 1, 2021.

*Primary Examiner* — Eldon T Brockman
(74) *Attorney, Agent, or Firm* — Schmeiser, Olsen & Watts LLP

(57) ABSTRACT

A monitoring system for monitoring a time period of a locking state of a rotor of a wind turbine includes at least one motion sensor and at least one computing unit, wherein the computing unit is configured to receive at least one motion measurement from the at least one motion sensor and wherein the computing unit is configured to determine whether the rotor may remain in the locking state or the rotor should be unlocked based on the at least one motion measurement. A wind turbine having the monitoring system and a method for monitoring a time period of a locking state of a rotor of a wind turbine is also provided.

12 Claims, 2 Drawing Sheets

(56) References Cited

U.S. PATENT DOCUMENTS

Figure 1:
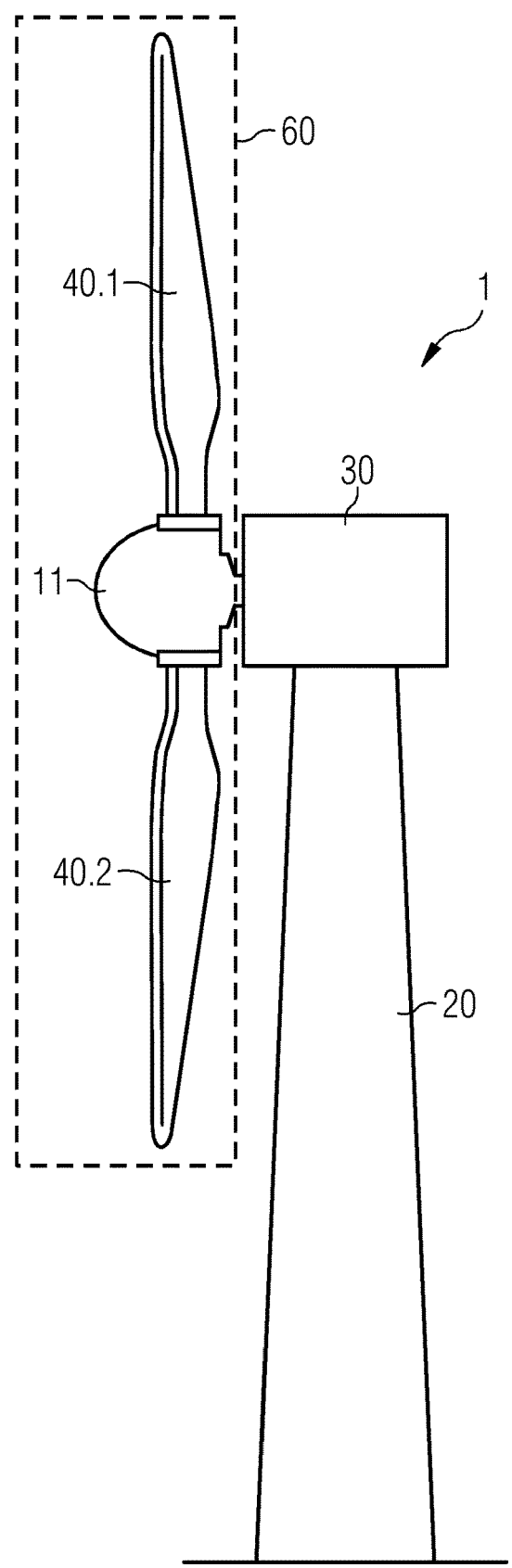

| | | | |
|---|---|---|---|
| 8,816,520 B2* | 8/2014 | Bywaters | F03D 7/0296 |
| | | | 290/44 |
| 11,585,326 B2* | 2/2023 | Hawkins | F03D 80/70 |
| 2008/0181761 A1* | 7/2008 | Moore | F03D 80/00 |
| | | | 415/1 |
| 2010/0194114 A1 | 8/2010 | Pechlivanoglou et al. | |
| 2012/0146333 A1* | 6/2012 | Bywaters | F03D 7/0248 |
| | | | 290/44 |
| 2016/0283622 A1* | 9/2016 | Bergua | F03D 7/046 |
| 2020/0232446 A1 | 7/2020 | Hawkins | |

\* cited by examiner

MONITORING SYSTEM AND METHOD FOR MONITORING A TIME PERIOD OF A LOCKING STATE OF A ROTOR OF A WIND TURBINE AND WIND TURBINE

CROSS-REFERENCE TO RELATED APPLICATIONS

This application claims priority to PCT Application No. PCT/EP2021/074086, having a filing date of Sep. 1, 2021, which claims priority to EP Application No. 20198406.9, having a filing date of Sep. 25, 2020, the entire contents both of which are hereby incorporated by reference.

FIELD OF TECHNOLOGY

The following relates to a monitoring system for monitoring a time period of a locking state of a rotor of a wind turbine, a wind turbine comprising the monitoring system and a method for monitoring a time period of a locking state of a rotor of a wind turbine.

BACKGROUND

Components of a drive train of a wind turbine such as bearings and gears must be exercised, i.e. rotated, to prevent standstill marks on them. Such standstill marks can eventually lead to failure of such component.

However, during certain maintenance tasks at the wind turbine, in particular the drive train, the drive train must be locked such that a rotation is prevented to protect the technicians performing the maintenance tasks from potential hazards resulting from the rotation of the components.

Therefore, during maintenance tasks, the drive train is locked and there is a risk of development of the standstill marks. The risk obviously increases with the time of the locking of the rotor. To avoid the standstill marks, it is therefore known to put a time limit on the period of locking the rotor of the drive train or, in other words, the locking state of the rotor. Such time limit may be in the range of a few hours.

However, if the maintenance task takes longer than the time limit, it is required to pause the maintenance task and turn the rotor, before the maintenance task can be continued due to the increased risk of standstill marks. However, the pausing of the maintenance task and turning of the rotor is cumbersome.

Other methods to reduce the loading in the wind turbine are known. US 2012/146333 A1 proposes a system for reducing dynamic loading in a wind power unit in a parked or idled condition. The system is configured to generate a braking signal in response to a dynamic loading signal indicated by a parameter sensed by a sensor. A brake system executes a reduced torque brake mode in response to the braking signal to reduce the dynamic loading of the wind power unit by permitting intermittent slip of the brake system. Regarding further prior art, reference is made to US 2020/232446 A1, US 2008/181761 A1, EP 3 073 109 A1 and US 2010/194114 A1.

Further, even with the described precaution measures, a risk of damages of the drive train due to the locking of the rotor can only be reduced but not eliminated.

SUMMARY

Accordingly, an aspect relates to enable maintenance tasks requiring locking of the rotor of the drive train of the wind turbine with a lower risk of damages of the drive train due to standstill marks, while the maintenance tasks should still be performed with as little interruption as possible for long durations of maintenance tasks.

A first aspect relates to means of a monitoring system for monitoring a time period of a locking state of a rotor of a wind turbine, whereby the monitoring system comprises at least one motion sensor and at least one computing unit, wherein the computing unit is configured to receive at least one motion measurement from the at least one motion sensor and wherein the computing unit is configured to determine whether the rotor may remain in the locking state or the rotor should be unlocked based on the at least one motion measurement.

Accordingly, embodiments of the invention provides for a monitoring system capable of detecting motions of the wind turbine. The motions may in particular be in the form of vibrations and/or oscillations. Accordingly, the motion sensor configured to detect motions of the wind turbine may be a vibration sensor and/or oscillation sensor and the motion measurements may be vibration measurements and/or oscillation measurements.

Based on the detected motions, the computing unit determines, in particular by means of calculations, a risk of standstill marks when the rotor remains in the locking state, i.e. remains locked. As long as the measured motions are little, the risk of formation of standstill marks is low and the computing unit may determine that the rotor may remain in the locking state. The locking state of the rotor may be a safety measure for allowing maintenance tasks to be performed at the wind turbine. Maintenance tasks performed by technicians may accordingly be continued during the determination that the rotor may remain in the locking state.

However, if the measured motions are high, the risk of formation of standstill marks is high as well and the computing unit may determine that the rotor should be unlocked based on the at least one motion measurement. Accordingly, when the rotor is unlocked, it may be turned to afterwards continue the maintenance tasks or if the motion is very high, the maintenance task may need to be paused or postponed. The computing unit may be configured to distinguish between such determinations of requiring a turning of the rotor to continue the maintenance task or of a required pausing or postponing of the maintenance task. As such, these determinations may be sub determinations when it is determined that the rotor should be unlocked.

Accordingly, embodiments of the invention takes into account the motion of the wind turbine as a risk factor further to the one of time which has been considered previously in the state of the art. Thereby, it is possible to significantly reduce the risk of damages of the drive train due to standstill marks because the risk correlates to the motions of the wind turbine, in particular the drive train, experienced due to the environmental conditions around the wind turbine much more than to time. Therefore, when the environmental conditions are good and accordingly the measured motions are little, the maintenance tasks may be performed with no interruption at all and for a very long duration.

Obviously, the monitoring system may be configured to continuously monitor the locking state of the rotor by continuously measuring the motion of the wind turbine, in particular of at least one component or more components of the drive train. Then the computing unit continuously receives motion measurements from the at least one motion sensor and can continuously determine whether the rotor may remain in the locking state or the rotor should be unlocked based on the motion measurements depending on the environmental conditions. A change in the environmental conditions resulting in larger motions can thus be noticed quickly. Consequently, that the rotor should be unlocked can be determined quickly by the computing unit to prevent any damage to the drive train of the wind turbine.

The determination may be based on a comparison of the at least one motion measurement and a predetermined threshold. The threshold may be predetermined such that its exceedance, i.e. when the at least one motion measurement exceeds it, allows for determination that the rotor should be unlocked because of an increased risk of standstill marks on the components of the drive train. As long as the at least one motion measurement falls below the predetermined threshold, it may alternatively be determined that the rotor may remain in the locking state.

The predetermined threshold may be based on a study of damaged drive trains of wind turbines and at least one measurement of at least one motion sensor in the time period leading up to a failure of the drive trains. Accordingly, the predetermined threshold is based on previous experience and thereby can be very accurately predetermined. The actually predetermined threshold may be provided with a safety buffer compared to the experience motions at failure of the studied drive trains. Alternatively, or additionally, the predetermined threshold may be based on a computer simulation of the drive train of the wind turbine.

Further, if there are more than one motion sensors, each of the motion measurements of each one of the motions sensors may be compared to one predetermined threshold or different predetermined thresholds for each one of the motion sensors. Alternatively, the predetermined threshold may be a value representing all motion measurements of the multiple motion sensors, such as an average of the measured motion.

Also, the predetermined threshold may be based on the at least one motion measurement and a specified time period. Thereby, the determination may be based on both the motions of the wind turbine resulting from the environmental conditions and a duration of the maintenance work. Thus, the determination of the computing unit on whether the rotor may remain in the locking state or the rotor should be unlocked may be based not only on the at least one motion measurement but also on a specified time period for the time period of the locking state. The risk of standstill marks can thereby be reduced even further. For example, the predetermined threshold may have the format of a motion threshold and a time threshold. When either of these is reached or exceeded, the computing unit may accordingly determine that the rotor should be unlocked. Alternatively, the predetermined threshold may include a motion threshold and a time threshold taking into account both, the motion and the time.

According to embodiments of the invention, the monitoring system further comprises a signaling system configured for outputting a signal or multiple signals based on the determination of the computing unit. The signal may be configured as a signal for the technicians performing the maintenance tasks. Thereby, the technicians may be easily informed about the determination of the computing unit, i.e. warned about an increased risk of standstill marks and the suggestion to unlock the rotor or receive the feedback that the rotor may remain in the locked state based on the determination performed by the computing unit. Accordingly, for safety reasons, it may still be at the discretion of the technicians, whether or not the rotor remains locked or is unlocked. The technicians can operate a locking control unit for locking the rotor according to the determination. However, alternatively, or in the case of increased risk, it may also be intended that the monitoring system or computing unit is operatively connected to the locking control unit. In this case, the monitoring system may operate the locking control unit, e.g. unlock the rotor, after a predetermined time after outputting a signal or multiple signals to the technicians, which may contain the warning that the rotor will be unlocked.

Further, the signaling system may be configured for outputting one of three different signals based on the determination of the computing unit. One signal may be a green signal or ok signal. This signal may be put out when it is determined that the rotor may remain in the locking state. Another signal may be a red signal or warning signal. This signal may be put out when it is determined that the rotor should be unlocked. Another one of the three signals may be a yellow signal or caution signal. This signal may be put out in further determination of the computing unit being in between the determinations that the rotor may remain in the locking state or that the rotor should be unlocked. For example, when continuous motion measurements do not yet exceed the predetermined thresholds but the measured motions become larger, the yellow signal or caution signal may be put out to inform the technicians that the rotor may soon need to be unlocked and the maintenance work may need to be interrupted.

The signaling system may be configured such that the signal is visual and/or acoustical. The signaling system may accordingly comprise as signal output units a siren, a screen and/or a lamp for outputting the signal. The signal is put out on multiple of the aforementioned signal output units such that it is more likely for the technicians to get noticed. The signal or signals may be put out in predetermined time intervals, for example in the range of 5 minutes to 15 minutes.

The at least one motion sensor may be an accelerometer. The accelerometer measures acceleration of the wind turbine, i.e. its structures and more particular the component or components of the wind turbine. The accelerometer may be a MEMS accelerometer, for example. The MEMS accelerometer has low noise, high resistance to repetitive high shocks and high insensitivity to high temperature differences.

A second aspect of embodiments of the invention relates to a wind turbine comprising the monitoring system according to the first aspect of embodiments of the invention.

The at least one motion sensor may be provided at a component of a drive train of the wind turbine. Accordingly, the motion may be measured directly at the component of the drive train experiencing the motion, i.e. vibrations and/or oscillations, for example, such that the risk of development of standstill marks at the component can be concluded from measurements performed directly at the component itself. In particular, the at least one motion sensor may be provided at, in particular attached to, components of the mechanical drive train such as a bearing or gearbox. It has been found that the aforementioned components of the drive train are most susceptible to standstill marks.

The at least one motion sensor may be attached to the component of the drive train. In particular, the at least one motion sensor may be embedded in a container and fixed to the component of the drive train to measure its motion, i.e. oscillations and/or vibrations, for example. The container may be a bi-axial or tri-axial container. Vibration measurements can be realized by detecting a frequency difference.

Further, the monitoring system may comprise multiple motion sensors provided at different components of the drive train of the wind turbine. In particular, a motion sensor may be provided at each or at least one of the bearings of the drive shaft and the gearbox. The measurement of motion at different components of the drive train enables local determination of risk of standstill marks at the respective components. It thereby increases the likelihood to determine a high risk of standstill marks prior to their development. In this respect, each component or motion sensor may have its own predetermined threshold.

The at least one motion sensor may be from a wind turbine control system of the wind turbine. The wind turbine control system is configured for controlling the operation of the wind turbine and as such already determines motion by means of motion sensors, in particular accelerometers attached to components of the drive train. As such, the at least one motion sensor for the monitoring system is already contained in the wind turbine, which saves costs for the implementation of the monitoring system in existing wind turbines and new wind turbines.

The locking of the rotor of the wind turbine, i.e. the locking state, may be achieved by means of at least one locking unit of the locking system of the wind turbine. The at least one locking unit may be in the form of a brake or at least one locking pin and corresponding pin insertion holes in the drive train, e.g. in the gearbox, when a geared topology of a drive train is used, for example. A locking control unit of the locking system may be provided for controlling the locking unit or locking units of the rotor of the wind turbine, i.e. for locking and unlocking the rotor. In the locked state, the rotor cannot rotate. In the unlocked state, the rotor can freely rotate.

A third aspect of embodiments of the invention relates to a method for monitoring a time period of a locking state of a rotor of a wind turbine, whereby the method comprises the steps of: measuring at least one motion of the wind turbine, and determining whether the rotor may remain in the locking state or the rotor should be unlocked based on the at least one measured motion.

The method may in particular be configured to be performed by means of the monitoring system according to the first aspect of embodiments of the invention. Accordingly, the measuring of the at least one motion of the wind turbine, which may in particular be a vibration and/or oscillation, may be performed by means of the at least one motion sensor of the monitoring system. Further, the determining whether the rotor may remain in the locking state or the rotor should be unlocked based on the at least one measured motion may be performed by means of the computing unit of the monitoring system.

According to embodiments of the invention, the method comprises the further step of outputting a signal or multiple signals based on the determination. For this purpose, the signaling system previously described with respect to the monitoring system may be used.

Finally, the method may comprise the further step of unlocking the locked rotor in the monitored time period upon determining that the rotor should be unlocked based on the at least one measured motion. As previously explained, this step may be performed by the technicians after receiving the signal or signals or automatically by means of the monitoring system or computing unit controlling the locking control unit.

BRIEF DESCRIPTION

Figure 2:
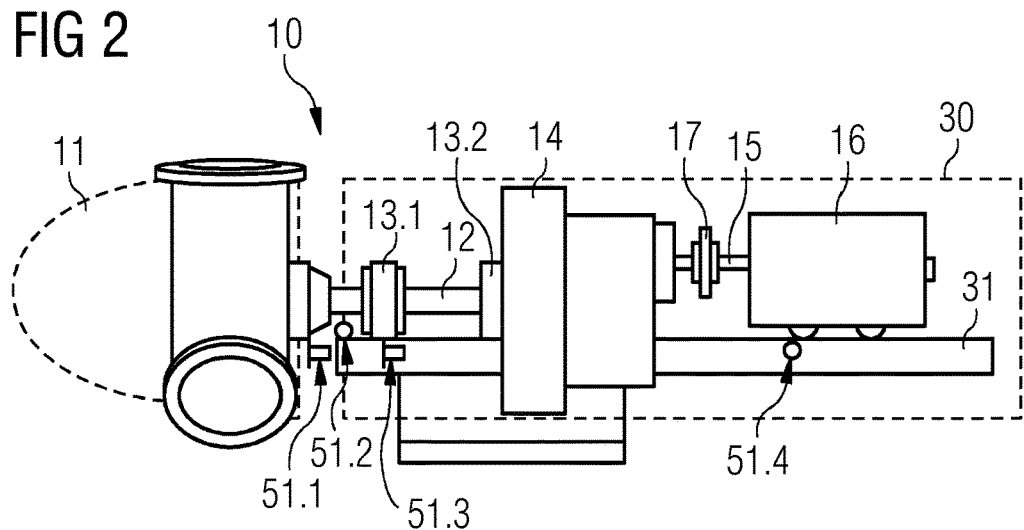
Figure 3:
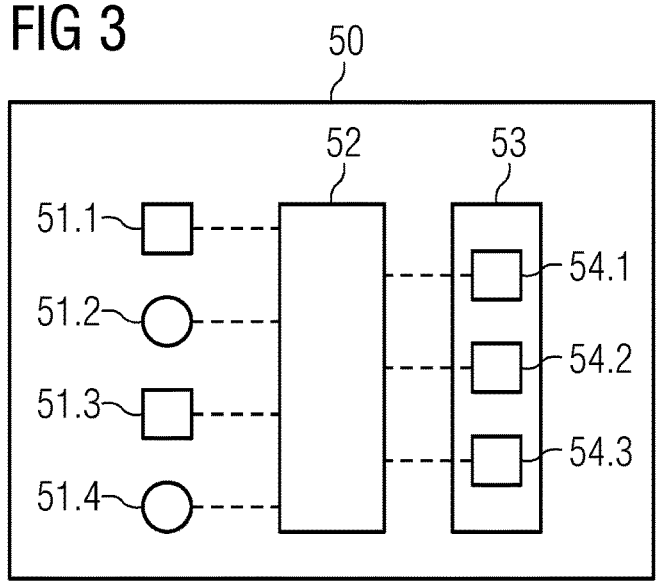
Figure 4:
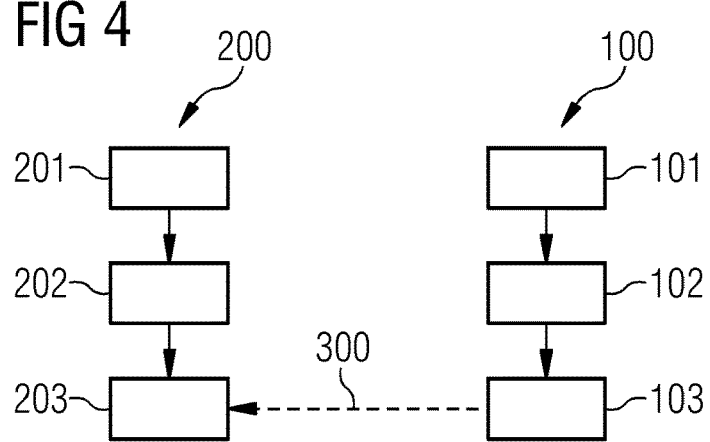

Some of the embodiments will be described in detail, with reference to the following figures, wherein like designations denote like members, wherein:

FIG. 1 shows a side view on a wind turbine;
FIG. 2 shows a cross-sectional view through the nacelle and on the drive train inside the nacelle of the wind turbine of FIG. 1;
FIG. 3 shows an illustration of a monitoring system for the wind turbine of FIGS. 1 and 2; and
FIG. 4 shows an illustration of a method for monitoring a time period of a locking state of a rotor of the wind turbine of FIGS. 1 and 2.

DETAILED DESCRIPTION

FIG. 1 shows a side view on a wind turbine 1. The wind turbine 1 comprises a supporting tower 20 and a nacelle 30, which is mounted on the supporting tower 20. The nacelle 30 contains a drive train 10 of the wind turbine 1 as shown in the cross-sectional view of the nacelle 30 in FIG. 2. The rotor 60 of the drive train 10 is provided outside of the nacelle 30. The rotor 60 consists of the hub 11 with two rotor blades 40.1, 40.2 attached thereto. However, the number of rotor blades 40 may alternatively be more than two, such as three, for example.

FIG. 2 shows a cross-sectional view through the nacelle 30 and on the drive train 10 inside the nacelle 30 of the wind turbine 1 of FIG. 1. The nacelle 30 comprises a main frame 31. The drive train 10 is supported on the main frame 31 of the nacelle. The topology of the drive train 10 is geared in FIG. 2, but may alternatively also be of a direct drive type.

The mechanical drive train 10 comprises multiple components 11, 12, 13.1, 13.2, 14, 15, 16, 17. These are the hub 11, the drive shaft 12 with its main bearings 13.1, 13.2, the gearbox 14 and the generator 16. The generator 16 is connected to the gearbox 14 via a generator shaft 15 which is provided with a brake 17. The brake 17 is a locking unit of a locking system having a locking control unit (not shown) for locking the generator shaft 15 in place and thereby locking the drive shaft 12 and the rotor 60. When the rotor 60 is locked, i.e. in a locking state, the rotor 60 cannot rotate.

The rotor 60 can alternatively or additionally be locked by a locking unit consisting of one more locking pins (not shown). By inserting one or more locking pins on either the side of the gearbox 14. This may be preferred over the brake 17, because a brake 17 based on friction should only be trusted to a limited extent. The locking unit may be on a high-speed or a low-speed part of the drive train 10.

As can be further taken from FIG. 2, oscillations of the nacelle 30 are measured by multiple motion sensors 51.1, 51.2, 51.3, 51.4. These motion sensors 51.1, 51.2, 51.3, 51.4 are configured as accelerometers and are part of a wind turbine control system (not shown). The wind turbine control system is configured for indirect monitoring of the condition of the rotor 60. The measurements used for this are the transverse and axial nacelle oscillations related to the drive shaft 12. FIG. 2 in this respect shows an exemplar configuration of motion sensors 51.1, 51.2, 51.3, 51.4 for measuring the nacelle oscillation of the horizontal axis wind turbine 1.

Because rotor-induced nacelle oscillation frequencies are rather low (typically from 0.1 Hz to 10 Hz), the motion sensors 51.1, 51.2, 51.3, 51.4 are configured to be able to measure within a bandwidth of 0 Hz (DC) to a maximum of about 20 Hz.

The nacelle can perform three oscillation modes, which are relevant for the condition monitoring and fault prediction of the rotor: transverse to the rotor axis, in line with the rotor axis and as torsion around the vertical tower axis. To monitor these oscillations, three motion sensors 51 are required. The motion sensors 51.3 is sensitive in the axial direction (related to the rotor axis). The motion sensors 51.2, 51.4 are sensitive in the transverse direction to the rotor axis. The motion sensor 51.1 is an inductive distance sensor. This sensor gives a reference signal for the absolute position of the rotor 60, when one of the rotor blades 40 is in the vertical upright position. The position information of the rotor 60 is required to calculate the phase information, which helps to detect a faults mass imbalance and aerodynamic asymmetry of the rotor 60.

FIG. 3 now shows a schematic representation of a monitoring system 50 to be used in the wind turbine 1 of FIGS. 1 and 2. The monitoring system 50 may be provided at any desired location at the wind turbine 1 or outside of the wind turbine 1. However, the motion sensors 51.1, 51.2, 51.3, 51.4 used for the monitoring system 50 as shown in FIG. 2 obviously must be located at the drive train 10 and are in this case already present in the wind turbine 1 for the wind turbine control system. Further, the signaling system 53 with its signaling units 54.1, 54.2, 54.3 should as well be present in the wind turbine 1 itself, e.g. inside of the nacelle 30.

A computing unit 52 of the monitoring system 50 is connected wirelessly or via cable with the motion sensors 51.1, 51.2, 51.3, 51.4 and with the signaling system 53.

FIG. 4 shows a schematic representation of a method 100 for monitoring a time period of a locking state of the rotor 60 of the wind turbine 1 by means of the monitoring system 50 of FIG. 3.

According to the method 100, a first method step 101 is that the motion sensors 51.1, 51.2, 51.3, 51.4 constantly measure the oscillations of the rotor 60 at different locations at the drive train 10 and transmits them to the computing unit 52.

The computing unit 52 contains in a storage unit (not shown) one or more predetermined thresholds for the measured oscillations of each one of the motion sensors 51.1, 51.2, 51.3, 51.4. In a second method step 102, the computing unit 52 compares the predetermined threshold or thresholds to the measurements received from the motion sensors 51.1, 51.2, 51.3, 51.4. It thereby determines whether the rotor 60 may remain in the locking state or the rotor 60 should be unlocked. Because the measured oscillations depend on the environmental conditions around the wind turbine 1, the measured oscillations correlate to a risk of standstill marks at the drive train 10, which are to be avoided to reduce a risk of failure of one of the components 11, 12, 13.1, 13.2, 14, 15, 16, 17 of the drive train 10 of the wind turbine 1.

In a third method step 103, the signaling system 53 is controlled by the computing unit 52 based on the determination on whether or not the rotor 60 may remain in the locking state. The signaling unit 54.1 is a siren, the signal unit 54.2 is a screen and the signaling unit 54.3 is a lamp. Accordingly, when it is determined that the rotor 60 should be unlocked, the siren may be turned on, the screen may show a notice that the rotor 60 should be unlocked and turned and the lamp may turn red, for example. Otherwise, when it is determined that the rotor 60 may remain in the locking state, the siren may be turned off, the screen may show the notice that it is safe to perform maintenance work and the lamp may turn green according to the control of the computing unit 52.

The locking method 200 runs parallel to the method 100 of monitoring the time period of the locking state of the rotor 60. In the first locking method step 201, the rotor 60 is being locked by means of the locking unit 17. This step may benefit from the method 100 in that the computing unit 52 may determine whether it is safe or not to lock the rotor 60.

After locking of the rotor 60, in the second locking method step 202, the maintenance work on the wind turbine 1 is performed by technicians. However, when the third method step 103 determines that the rotor 60 should be unlocked, according to the arrow 300, which may refer to the signaling by means of the signaling system 52, the rotor 60 is unlocked und turned in the third locking method step 203. Alternatively, the arrow 300 may refer to a control of the monitoring system 50 of the locking control unit automatically unlocking the rotor 60, turning it and again locking the rotor 60. However, such optional control and operation may be signaled to the technicians via the signaling system 53 prior to being performed such that the safety of the technicians may be ensured.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A monitoring system for monitoring a time period of a locking state of a rotor of a wind turbine, comprising:
    at least one motion sensor,
    at least one computing unit, wherein the at least one computing unit is configured to receive at least one motion measurement from the at least one motion sensor and wherein the at least one computing unit is configured to determine whether the rotor may remain in the locking state or the rotor should be unlocked based on the at least one motion measurement; and
    a signaling system configured for outputting a signal based on the determination of the at least one computing unit, wherein the signaling system is configured such that the signal is visual and/or acoustical, and wherein the signaling system is configured for outputting the signal with the rotor remaining in the locking state.

2. The monitoring system according to claim 1, wherein the determination is based on a comparison of the at least one motion measurement and a predetermined threshold.

3. The monitoring system according to claim 2, wherein the predetermined threshold is based on a study of damaged drive trains of wind turbines and at least one measurement of at least one motion sensor in the time period leading up to a failure of the drive trains.

4. The monitoring system according to claim 2, wherein the predetermined threshold is based on the at least one motion measurement and a specified time period.

5. The monitoring system according to claim 1, wherein the signaling system is configured for outputting one of three different signals based on the determination of the at least one computing unit.

6. The monitoring system according to claim 1, wherein the at least one motion sensor is an accelerometer.

7. A wind turbine comprising the monitoring system according to claim 1.

8. The wind turbine according to claim 7, wherein the at least one motion sensor is configured provided at a component of a drive train of the wind turbine.

9. The wind turbine according to claim 7, wherein the monitoring system comprises multiple motion sensors provided at different components of the drive train of the monitoring system.

10. The wind turbine according to claim 7, wherein the at least one motion sensor is from a wind turbine control system of the wind turbine.

11. A method for monitoring a time period of a locking state of a rotor of a wind turbine, of the method comprising:
   measuring at least one motion of the wind turbine;
   determining whether the rotor may remain in the locking state or the rotor or should be unlocked based on the at least one measured motion; and
   outputting a signal based on the determination, wherein the signal is visual and/or acoustical, and wherein the signal is outputted with the rotor remaining in the locking state.

12. The method according to claim 11, further comprising: unlocking the locked rotor in the monitored time period upon determining that the rotor should be unlocked based on the at least one measured motion.

\* \* \* \* \*